Jan. 23, 1968

G. THEURIAUX 3,364,865

PROPORTIONING WHEEL AND INSTALLATION FOR THE APPLICATION THEREOF

Filed Sept. 7, 1965

INVENTOR
Gabriel Theuriaux

BY Bacon & Thomas

ATTORNEY

Jan. 23, 1968

G. THEURIAUX 3,364,865

PROPORTIONING WHEEL AND INSTALLATION
FOR THE APPLICATION THEREOF

Filed Sept. 7, 1965

INVENTOR

Gabriel Theuriaux

BY Bacon & Thomas

ATTORNEY

United States Patent Office 3,364,865
Patented Jan. 23, 1968

3,364,865
PROPORTIONING WHEEL AND INSTALLATION
FOR THE APPLICATION THEREOF
Gabriel Theuriaux, Montlucon, France, assignor to Commissariat à l'Energie Atomique, Paris, France
Filed Sept. 7, 1965, Ser. No. 485,414
Claims priority, application France, Sept. 15, 1964, 988,139
8 Claims. (Cl. 103—85)

ABSTRACT OF THE DISCLOSURE

The present invention relates to a proportioning wheel for supplying material from a reservoir to a utilization device at a relatively low constant rate. More particularly the invention relates to a proportioning wheel which is well suited for the continuous supply of a liquid, such as a radio-active liquid, at a precise low rate.

---

The continuous supply of certain types of apparatus such as those employed for processing radio-active liquids must in fact be carried out at a rate of flow which is too low to be obtained by means of proportioning pumps of types which are at present known. However, it is extremely important to ensure that such apparatus is supplied at a precise and constant rate.

In order to meet this requirement, the present invention provides a proportioning wheel in which the entire contents of the buckets are discharged into the collector without any risk of leakage and return to the storage tank. Flow variations are also reduced to a minimum.

In accordance with the invention, the proportioning wheel comprises, within a closed casing in which the bottom of said casing forms a reservoir, a rotary hub; cylindrical drawing-buckets each having an axially movable base for the purpose of regulating its capacity, a lateral inlet for the admission of the quantity to be drawn and located near the front wall of said bucket and an emptying outlet at the level of said inlet; radial emptying tubes fixed to said bucket inlet and in the hub, and a collector placed around one open end of said hub and in coaxial relation thereto.

The orifices of the buckets are so shaped as to ensure accurate filling and the supporting and draining-off tubes open in the vicinity of these orifices in such a manner as to permit a total emptying at the time of tipping of the buckets. No drop of liquid or solid particle can therefore remain within said bucket as it is necessarily discharged into the tube.

The rate of delivery or of flow is thus solely a function of the speed of the wheel and the capacity of the buckets, which are two constant values.

The invention also extends to the installations which comprise a series of proportioning wheels and a system is employed for driving such wheels at strictly proportional speeds.

In certain cases, it is in fact necessary to feed a number of apparatuses at strictly proportional rates of delivery, for example the different stages of a same process, or even to supply a same apparatus with a number of different elements in proportional quantities. These feeding operations are carried out under satisfactory conditions by ensuring that the wheels which provide constant and accurate delivery are driven at proportional speeds.

Figure 1:
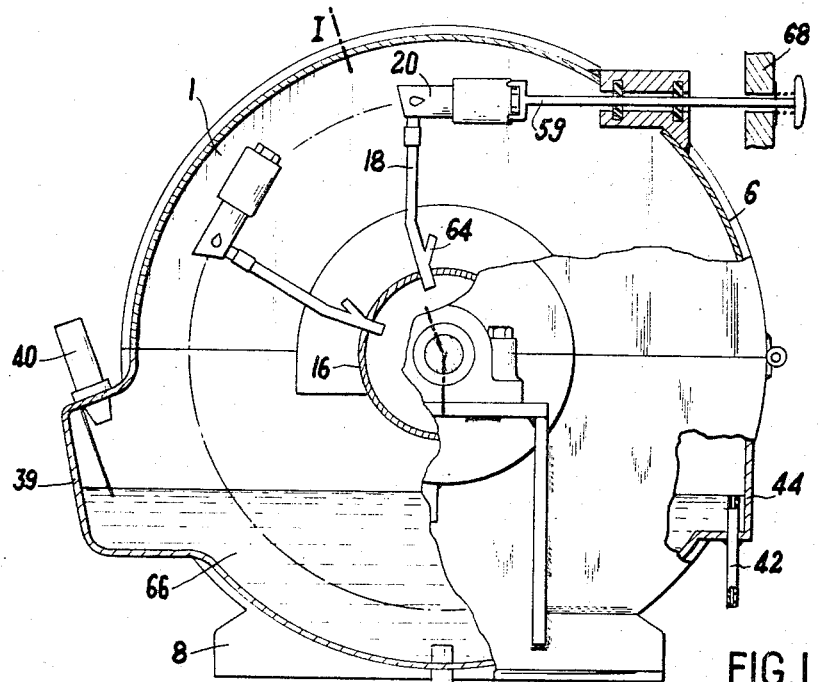
Figure 2:
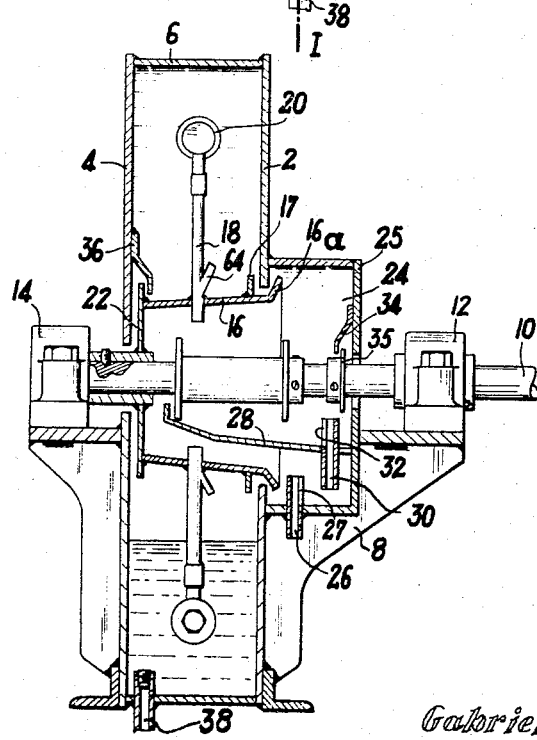
Figure 3:
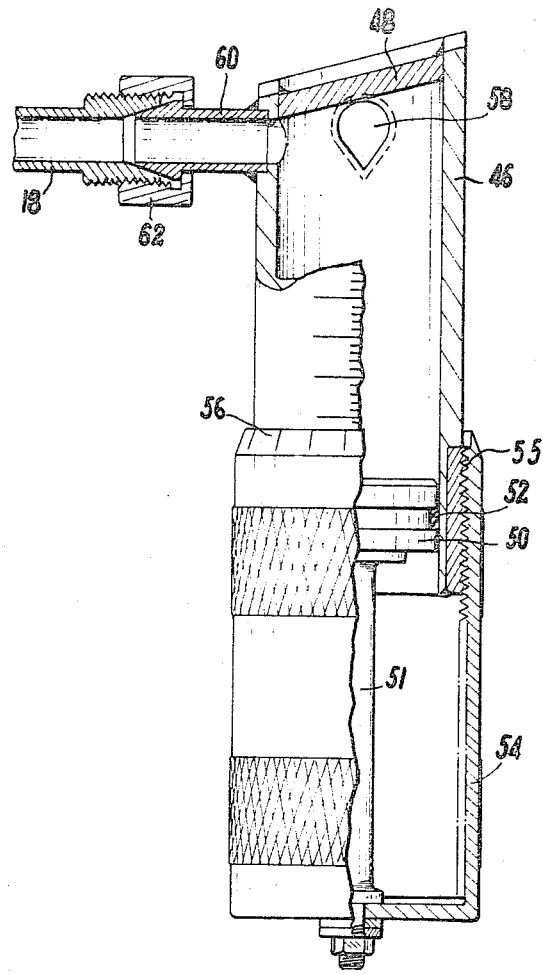
Figure 4:
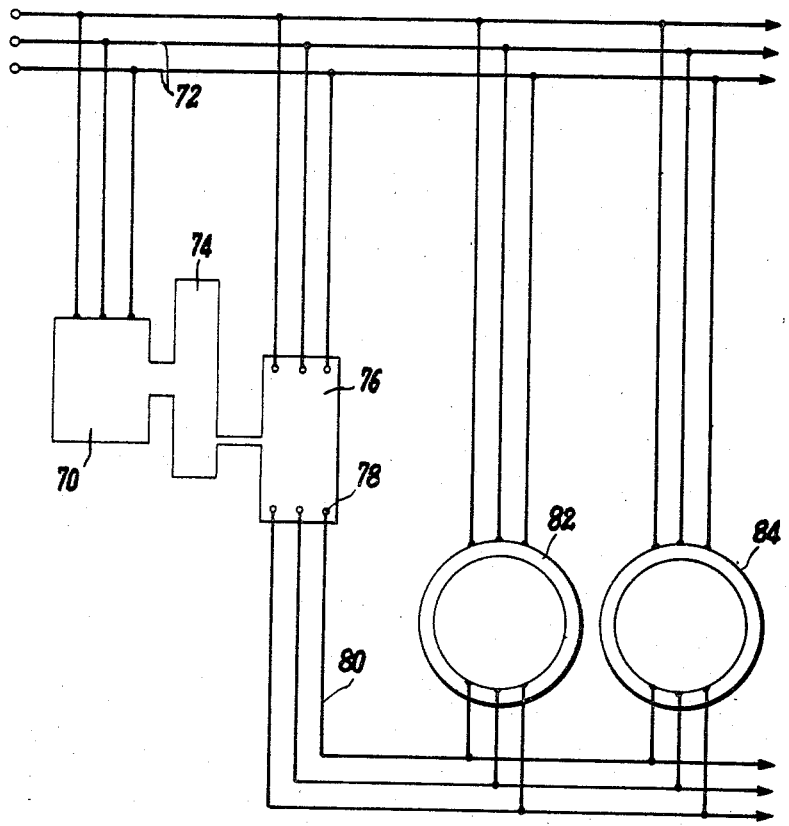

A number of different advantages and characteristic features of the invention will in any case become apparent from the following description of one form of embodiment which is given by way of example and illustrated in the accompanying drawings, in which:

FIG. 1 is a fragmentary side view of a proportioning wheel in accordance with the invention,
FIG. 2 is a cross-section taken along line I—I of FIG. 1,
FIG. 3 is a sectional view on a larger scale showing the constructional arrangement of a bucket,
FIG. 4 is a diagram of the system adapted for driving an installation which comprises a number of proportioning wheels.

As shown in FIGS. 1 and 2, the proportioning wheel in accordance with the invention comprises a closed casing 1 composed of two side-plates 2 and 4 which are joined together by means of a ring 6 and fixed on a support frame 8. Said casing is traversed axially by a shaft 10 which is driven in rotation by a motor (not shown) and which is carried by two bearings 12–14 fixed to the frame 8. Around said shaft 10, a slightly conical hub 16 is traversed radially by tubes 18 which each carry a cylindrical bucket 20.

One end of the hub 16 is fixed to the shaft 10 by means of an end-plate 22 whilst the other end of said hub is open and communicates with a collector 24 formed by a cylindrical housing 25 which is fixed to the side-plate 2 around the shaft 10. A pipe 26, only the end of which is shown in FIG. 2, connects said collector 24 to the apparatus to be supplied. Inside said collector and said hub 16, a small trough 28 is located beneath the shaft 10 and secured to the wall 25. Said small trough communicates with the collector 24 via a pipe 30 which penetrates to a certain distance inside the trough 28 and is pierced by a longitudinal slot 32 for the passage of liquid or other transported material from the trough 28 to the collector 24.

An annular deflector 34 which is fixed to the wall 25 of the collector 24 cooperates with another deflector 35 which is carried by the shaft 10 so as to protect the bearing 12 of said shaft 10 against any projection of material and to ensure fluid-tightness at the point at which the shaft 10 passes through the wall 25. The bearing 14 and the point at which the shaft passes through the side-plate 4 are protected in similar manner by means of the end-plate 22, the external diameter of which is larger than that of the hub 16, and a deflector 36 which is fixed to the inner face of said side-plate 4.

A raised rim 16a of the hub 16 and a flange 17 which are located on each side of the side-plate 2 additionally isolate the interior of the casing 1 from the collector 24.

The bottom of the casing 1 forms a reservoir 66 for the material to be conveyed such as, for example, a liquid. A supply inlet is provided on one side of said casing in a bulge 39 of the ring 6 and in said inlet can be fitted, for example, the end of a pipe 40 for the admission of liquid. An overflow pipe 42 which is placed within another bulge 44 of the casing serves to ensure a constant level of liquid within the reservoir whilst an evacuation outlet 38 is provided at the bottom of the casing.

The quantities of liquid or of material to be conveyed to the apparatus to be supplied are scooped up by the buckets 20 which are each carried by a tube 18 and each comprises a cylindrical body 46 (as shown in FIG. 3) which is closed at the front end by a slightly inclined wall 48. The bottom of the cylinder is formed by a piston 50 which is adapted to move axially in such a manner as to regulate the filling capacity of the bucket, leak-tightness of contact between the piston 50 and the cylinder 46 being ensured by means of sealing rings 52. The rod 51 of the piston 50 is rigidly fixed to a cylindrical end-cap 54 which is screwed onto an external thread 55 of the cylinder 46. A vernier 56 which is graduated on the cylinder 46 and on the end-cap 54 serves to indicate with precision the value of the bucket capacity according to whether the end-cap 54 is screwed to a greater or lesser extent onto the said cylinder 46.

At the front end thereof, namely at the end nearest the wall 48, the bucket is pierced by at least one lateral orifice 58 having a substantially rounded shape and extending to a point at the rear. At the level of said orifice, a tube 60 is attached to an opening of the cylinder 46. Said tube is coupled by means of a nut 62 to the threaded end of the radial tube 18 which is mounted on the hub 16. A small nozzle 64 (shown in FIG. 1) which is located near said hub 16 connects the tube 18 to the atmosphere and thus permits the evacuation of the air contained in the bucket and in said tube 18 progressively as the filling takes place.

As and when the shaft 10 rotates, each bucket 20 moves down in turn to the top of the reservoir 66, then penetrates into and passes through said reservoir over a distance corresponding to approximately one quarter of a revolution. This movement permits the material contained in the reservoir to penetrate through the intake orifices 58 into the interior of the cylinder 46 and to fill this latter.

As the movement of rotation of the shaft 10 and hub 16 proceeds and the bucket 20 accordingly emerges from the reservoir 66, the cylinder 46 is filled and the liquid which exceeds the requisite quantity, namely the capacity of the cylinder 46 between the piston 50 and the intake orifice 58, escapes from the bucket through the lower end of said orifice 58. The pointed shape of said leakage end facilitates the evacuation of any drop or particle even of small size which is in excess of the predetermined volume.

At the moment when each tube 18 reaches the substantially horizontal position, the level of liquid within the bucket is exactly that of the pointed end of the intake orifice. The bucket which is accordingly vertical then begins to tip over. The liquid flows into the tube 60 and progressively escapes from the bucket 20 so as to penetrate within the hub 16 into the trough 28. The slots 32 of the pipe 30 allow a uniform quantity of liquid to pass from the trough 28 to the collector 24. Said liquid is then conveyed from said collector to the apparatus to be supplied via the tube 26 which is provided in the same manner as the tube 30 with an extension inside the collector and with a longitudinal slot 27 formed in said extension.

As the liquid contained in the bucket flows into the tube 18, the air previously contained in said tube is discharged through nozzles 64, the angle of inclination at which said nozzles are set being such as to permit of good evacuation and thus to prevent any danger of admission of air within the hub 16.

The delivery of the wheel is therefore strictly determined by the capacity of the cylinder 46 and by the speed of rotation of the shaft 10 which controls the rate of filling and emptying of the buckets 20. The speed of rotation of the shaft 10 can readily be modified by regulating the driving motor. The capacity of the buckets can also be regulated by screwing or unscrewing the cylindrical end-cap 54 relative to the cylinder 46, that is to say by displacing the piston 50 within the cylinder 46. In the preferred form of embodiment which is illustrated in FIG. 1, the screwing or unscrewing of the end-cap is effected from the exterior of the casing 1 by means of a rod 59 which traverses the ring 6 in leak-tight manner, said rod 59 being driven in rotation from the exterior by any suitable means. An adjustment operation as thus contemplated is preferably carried out in the position of the bucket 20 which is shown in FIG. 1, namely when said bucket has just been emptied; before reaching this position, the final movement of the bucket at the end of its travel serves merely to allow the exterior of said bucket to drip and above all to permit of complete emptying of the tube 18 into the trough 28 prior to the next filling.

A proportional wheel as thus designed can be employed for all kinds of substances whether solid or liquid, but its precision makes it particularly well suited to the continuous supply of a liquid which can even be a radioactive liquid. In this latter case, the leaktight casing 1 is placed inside an enclosed vessel. The shaft 10 is in that case driven from the exterior of said vessel and the capacity of the bucket 20 is regulated also from the exterior, the rod 59 being passed through the shield wall 68 as shown in FIG. 1.

Moreover, the uniform delivery which is thus obtained makes this wheel very useful when a certain number of liquids have to be supplied to an apparatus at either constant, equal or proportional flow rates. The installation employed in such a case comprises a series of proportioning wheels which are operated from the same drive system in order to ensure that the speeds of rotation of said wheels should have ratios corresponding to the ratios of the flow rates to be obtained. When the flow rates have to be equal, the proportioning wheels can even be mounted on a same shaft so as to rotate strictly at the same speed. In the majority of cases, the installation will consist of a number of sets of proportioning wheels, each set having its own speed of rotation.

In the example of embodiment which is shown in FIG. 4, it has been assumed that the installation is made up of three sets of proportioning wheels. The complete assembly is driven from a motor 70 which is supplied with three-phase current from a mains line 72. Said motor drives through a speed-changing mechanism 74 a first set of proportioning wheels which are mounted on a same driving shaft. A transducer 76 is keyed on said shaft and is also connected to the three-phase current supply 72. A three-phase voltage supply is available at the terminals 78 of said transducer at a frequency which is strictly dependent on the speed of rotation of the transducer shaft and therefore on the speed of the first proportioning wheels. Cables 80 serve to connect said transducer 76 to two motors 82, 84 which drive the two other sets of proportioning wheels. Said motors rotate in strict synchronism with the transducer 76 which supplies current to the rotors of said motors whilst the stators are supplied from the mains line. The speed of rotation of both sets of proportioning wheels which are driven by the motors 82, 84 is therefore at each moment proportional to the speed of the wheels of the first set and the rates of delivery of said wheels are also proportional.

Should it prove necessary for any reason to modify the volume delivered by one of the proportioning wheels, the capacity of the buckets 20 is regulated by rotating the cylindrical end-caps 54 and thus displacing the pistons 50. This operation can readily be remote-controlled.

In a nuclear installation, the assembly consisting of motor 70 and transducer 76 will preferably be located in a zone which permits of ready access, whilst the wheels which are driven by the motors 82–84 can serve for the supply of radioactive liquid. The speed-changing mechanism 74 also makes it possible to produce a continuous variation in all of the flow rates while strictly maintaining the respective proportions.

A processing apparatus can thus be supplied with a certain number of different liquids in a constant and accurate manner. Similarly, a series of processing apparatuses could be supplied in turn with predetermined quantities which are strictly proportional to the product which is being processed, the respective proportions being maintained strictly constant even when the volume delivered is modified by the variation in speed of rotation of the complete assembly. Each delivery can nevertheless be regulated at any given moment.

It will be understood that a number of different modifications could be made in the form of embodiment which has just been described without thereby departing either from the scope or the spirit of the invention.

What I claim is:
1. A proportioning wheel comprising,
    a closed casing having a bottom which forms a reservoir for material,
    a rotary hub mounted within said casing,
    a plurality of cylindrical drawing buckets each having an axially movable base for the purpose of regulating its capacity, each said bucket having a front wall including a lateral inlet adjacent thereto to admit material to be carried by said bucket, an emptying outlet in each bucket at the level of said inlet, an emptying tube for each bucket, extending radially from said hub and fixed to said emptying outlet, and a main collector, said hub having one open end around which said collector is located in communicating coaxial relationship.

2. Proportioning wheel as claimed in claim 1, wherein the lateral inlet of each bucket has a rounded shape rearwardly extending to a point.

3. Proportioning wheel as claimed in claim 1, wherein the movable base consists of a piston rigidly fixed to a cylindrical end-cap which is screwed onto the bucket body.

4. Proportioning wheel as claimed in claim 1, wherein said wheel is provided with an air-escape nozzle located in each emptying tube in the vicinity of the hub.

5. Proportioning wheel as claimed in claim 1, wherein an intermediate flow-regulating collector is mounted inside the hub and main collector and communicates with said collector.

6. Feed-regulating installation comprising a plurality of proportioning wheels each comprising a series of cylindrical buckets of adjustable capacity, each bucket being provided close to the front wall thereof with a lateral inlet and connected to a central collector by means of a drain-off tube having its opening opposite to said inlet, and a device for driving said proportioning wheels at speeds which are proportional to each other.

7. Installation as claimed in claim 6, wherein said installation comprises a first set of proportioning wheels mounted on a same shaft and driven at the same speed and at least one second set of wheels driven at a speed which is a function of the speed of the first set.

8. Installation as claimed in claim 7, wherein the second sets of proportioning wheels are driven by motors which are supplied with a current having a frequency which is a function of the speed of rotation of the wheels of the first set.

References Cited

UNITED STATES PATENTS

| | | | |
|---|---|---|---|
| 730,260 | 6/1903 | Harris | 103—85 |
| 1,372,768 | 3/1921 | Mott | 103—85 |
| 1,691,687 | 11/1928 | Watts | 73—424 |
| 2,877,051 | 3/1959 | Cushman et al. | 103—85 |

FOREIGN PATENTS

| | | |
|---|---|---|
| 335,743 | 12/1903 | France. |
| 347,172 | 12/1904 | France. |
| 652,240 | 11/1935 | Germany. |

HENRY F. RADUAZO, *Primary Examiner.*

DONLEY J. STOCKING, *Examiner.*